United States Patent
Krikorian et al.

(10) Patent No.: US 6,759,981 B1
(45) Date of Patent: Jul. 6, 2004

(54) ENHANCED EMITTER LOCATION USING ADAPTIVE COMBINATION OF TIME SHARED INTERFEROMETER ELEMENTS

(75) Inventors: Kapriel V. Krikorian, Oak Park, CA (US); Robert A. Rosen, Simi Valley, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/345,776

(22) Filed: Jan. 15, 2003

(51) Int. Cl.[7] .................................................. G01S 5/02
(52) U.S. Cl. ...................................... 342/424; 342/442
(58) Field of Search ................................ 342/374, 424, 342/442, 450, 457

(56) References Cited

U.S. PATENT DOCUMENTS

| | | | |
|---|---|---|---|
| 5,568,394 A | | 10/1996 | Krikorian et al. |
| 5,657,027 A | | 8/1997 | Guymon, II |
| 5,955,990 A | * | 9/1999 | Acoraci et al. ............. 342/373 |
| 6,104,346 A | * | 8/2000 | Rudish et al. .............. 342/424 |
| 6,225,949 B1 | * | 5/2001 | Guard ......................... 342/442 |
| 6,255,991 B1 | * | 7/2001 | Hedin ......................... 342/424 |
| 6,313,794 B1 | * | 11/2001 | Rose ........................... 342/424 |

* cited by examiner

*Primary Examiner*—Dao Phan
(74) *Attorney, Agent, or Firm*—Leonard A. Alkov

(57) ABSTRACT

An interferometer array system for processing pulse signals from a target emitter includes an n element interferometer array of radiator elements for producing radiator signals in response to the pulse signals from the target emitter. M processing channels process radiator signal elements, where m<n. A switch matrix is connected between the array and the processing channels, switching different combinations of the radiator elements to the channels within a single pulse to achieve processing of all radiator signals within a single pulse of said pulse signals from the target emitter.

7 Claims, 2 Drawing Sheets

ENHANCED EMITTER LOCATION USING ADAPTIVE COMBINATION OF TIME SHARED INTERFEROMETER ELEMENTS

BACKGROUND OF THE DISCLOSURE

Interferometer arrays are used to provide accurate localization of emitters. Most systems support a limited number of simultaneous interferometer channels over several antenna elements resulting in ghosting and degraded localization particularly in dense emitter environments. Current implementations also depend on the accurate de-interleaving of pulse trains from different emitters.

Prior attempts depended on de-interleaving pulse trains and could coherently combine only a limited number of interferometer elements resulting in significantly larger error rates and poorer precision.

SUMMARY OF THE DISCLOSURE

An interferometer array system for processing pulse signals from a target emitter includes an n element interferometer array of radiator elements for producing radiator signals in response to the pulse signals from the target emitter. M processing channels process radiator signal elements, where m<n. A switch matrix is connected between the array and the processing channels, switching different combinations of the radiator elements to the channels within a single pulse to achieve processing of all radiator signals within a single pulse of said pulse signals from the target emitter.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE DISCLOSURE

For an interferometer, coherent (complex voltage) measurements from each element are used to determine the relative phases and derive the angles of arrival of the emitter. For reduced costs the number of simultaneous emitter channels can be reduced. This reduction in the number of simultaneous receive channels can cause angle ambiguities. A technique is described to overcome this deficiency.

Fast intra-pulse switching reduces ghosting from multiple emitters and achieves accurate two-dimensional (2-D) angle of arrival on a single pulse basis. Coherent combination can be employed to achieve the enhanced performance of large interferometer arrays with a limited number of simultaneous channels.

Fast intra-pulse switching among interferometer elements is provided by currently available switches. Using an adaptive element switching strategy and coherent combination of elements, very precise localization of emitters is achieved within a short time without the de-interleaving of pulse trains.

Figure 1:
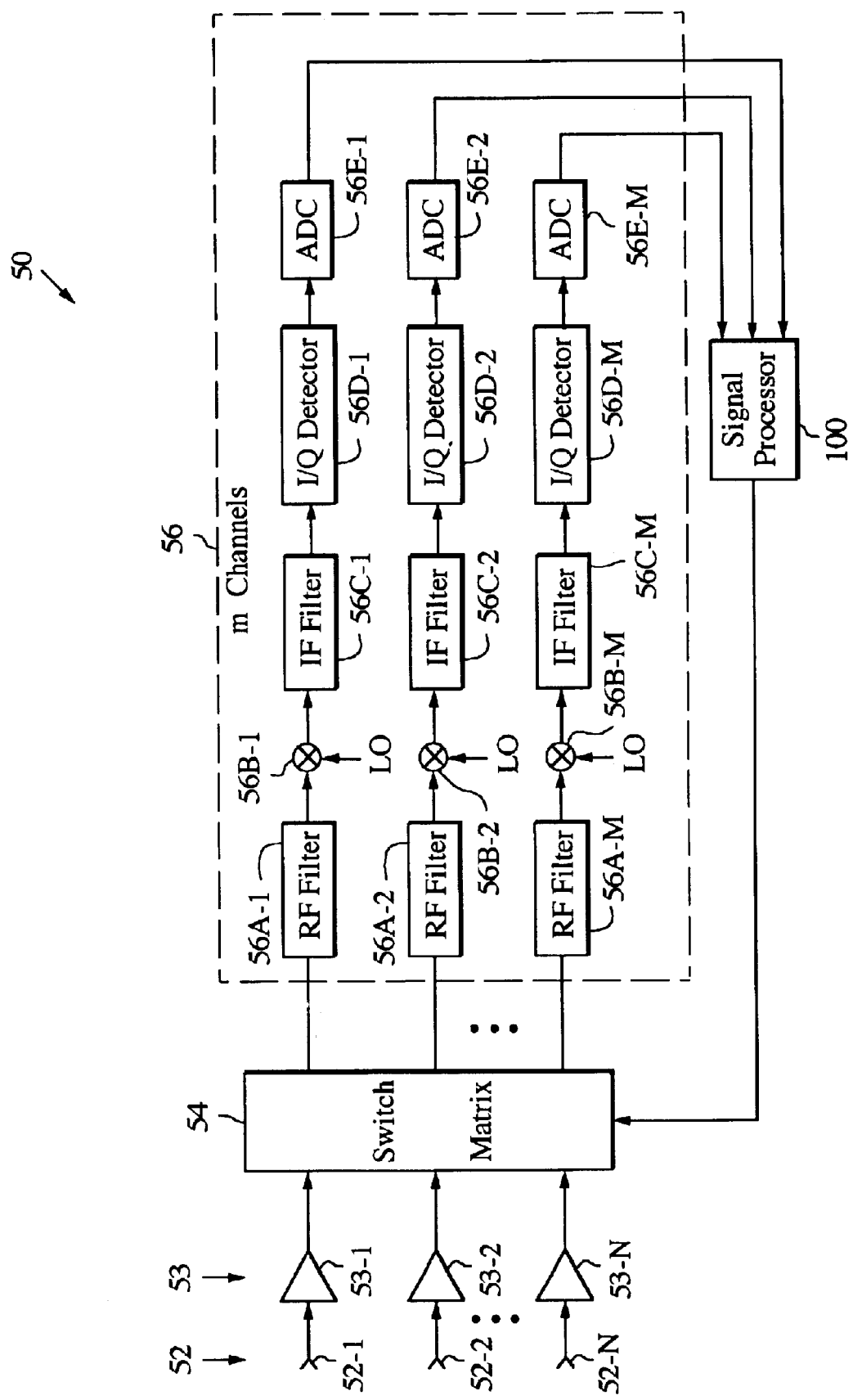
FIG. 1 is a schematic system block diagram of an embodiment of an interferometer array in accordance with aspects of the invention, employing an array of time-shared radiator elements.
Figure 2:
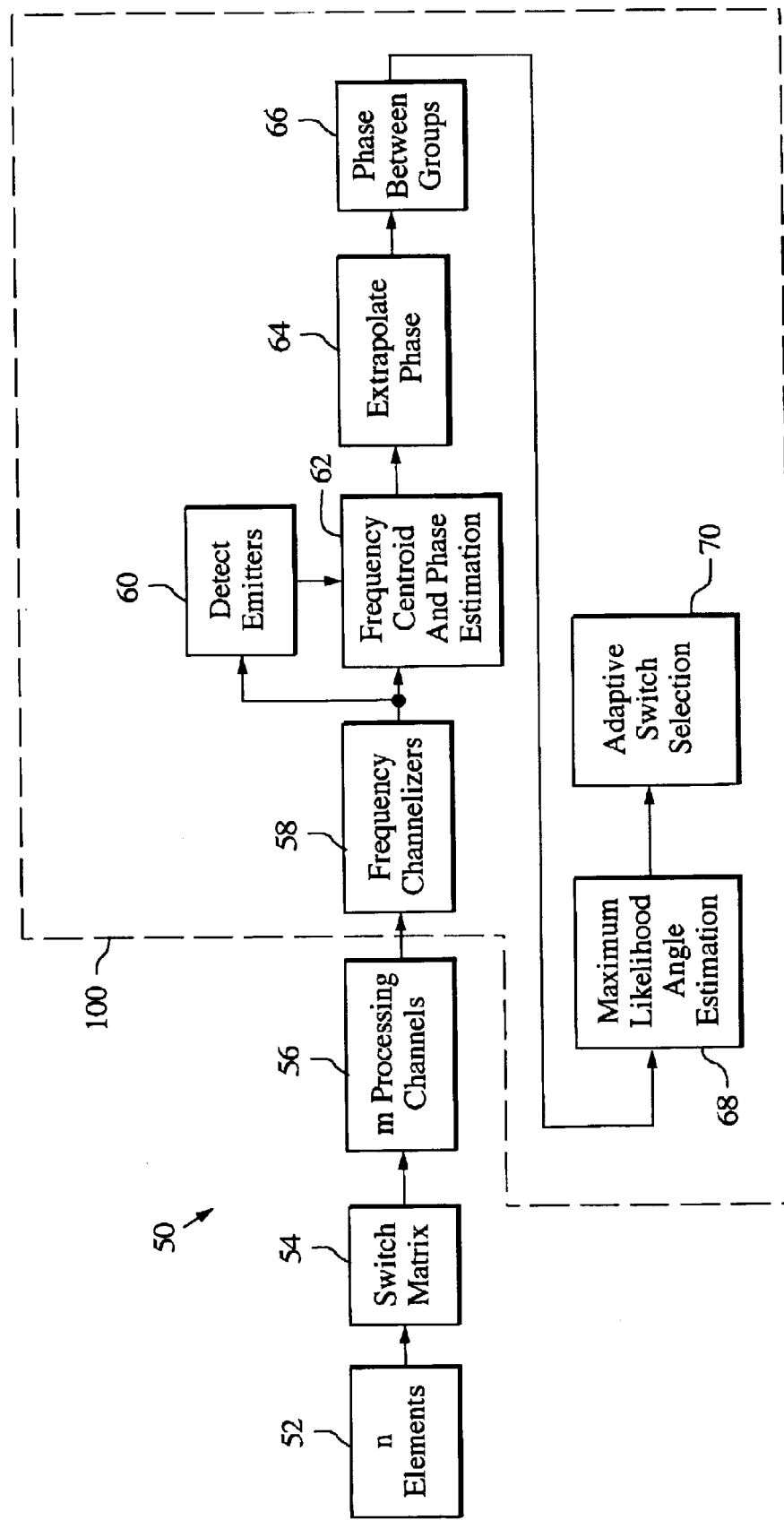
FIG. 2 is a processing block diagram further illustrative of the system of FIG. 1.

An exemplary embodiment of an n element interferometer array system 50 is illustrated in the schematic system block diagram of FIG. 1 and the processing block diagram of FIG. 2. As can be seen in FIG. 1 the system has n radiator elements 52, and m processing channels 56, where m<n. The system includes a switching matrix 54 between the elements 52 and the processing channels 56. The switching matrix 54 may restrict the combinations of elements that can be processed simultaneously. Known switch technology is capable of achieving switching in less than half a microsecond, which is significantly shorter than the pulse width of most emitters. A simple implementation of the switch matrix may include m single pole double throw switches, with each switch connecting one channel to two elements. This embodiment of the invention exploits the fast switching capability to process the contributions of the radiator elements of the interferometer within a single pulse. This allows estimation of emitter locations without the need of de-interleaving emitter pulse trains.

In an exemplary embodiment, each channel includes an RF filter, e.g. filter 56A-1, for filtering the radiator signal, a frequency down-converter, e.g. mixer 56B-1, for mixing the filtered RF signal with a local oscillator (LO) signal, an I/Q detector, e.g. detector 56D-1, and an analog-to-digital converter (ADC), e.g. ADC 56E-1. The digitized signals from each channel is fed to signal processor 100. Functions performed by an exemplary signal processor 100 are shown in FIG. 2.

In the simplest application, the elements 52 are grouped in non-overlapping sets without utilizing the relative phase between the groups. Improved performance can be achieved by determining the phase between all the elements.

In another application, overlapping groups of elements 52 are employed. The relative phase between any two elements in different groups can be determined by appropriately adding or subtracting the relative phases with a common element.

Alternatively, for non-overlapping groups of elements 52, coherent processing may be performed over time by first frequency channelizing each element using frequency channelizers 58 (FIG. 2), i.e., an FFT over the collected time samples, estimating the frequency of detected emitters using an emitter detector function 60 and frequency centroid and phase estimation function 62, and extrapolating the phase to a common time by phase extrapolator function 64. The extrapolated phase is obtained by adding the estimated phase increment to the measured phase. The estimated phase increment is given by $$\Delta\Phi = 2\pi f_{est} \Delta t$$

where $f_{est}$=estimated emitter frequency from the frequent centroid $\Delta t$=time increment to the next processing interval The measured phase is given by:

$$\Phi_{meas} = a\tan2(Q, I)$$

where I and Q are the real and imaginary parts of the FFT filter output, a tan2(Q, I) is the notation for the arctangent of the ratio of Q to I, and the arctangent may be obtained by table lookup. The frequency estimates are improved by combining the measurements from all the channels. For wideband coded pulses, estimates from several FFT filters from each element will be used to determine the relative phase. The relative phases are then combined using a maximum likelihood estimator 68 to obtain accurate emitter locations with low gross error rate. An adaptive switch function 70 is employed to change the switch selection.

An exemplary efficient implementation of the maximum likelihood estimator 68 is a 2-D FFT using the element phasors and locations. In addition, beside the maximum likelihood estimate, the other likely locations are also output. Based on these locations, a best subset of interferometer array elements can be adaptively selected using the adaptive switch selection function 70. A new set of measurements is then taken to further improve the emitter location accuracy and reduce the gross error rate. For example, for an n=8 element interferometer with m=4 receive channels and channel i connected to elements 2i and 2i−1 (where i=1, . . . , 4), an element configuration of 1, 4, 5 and 8 could be commanded based on earlier measurement made with elements 2, 3, 6 and 8.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An interferometer array system for estimating a location of a target emitter, comprising:
    an n element interferometer array of radiator elements for producing radiator element signals in response to signals from the target emitter:
    m processing channels for processing radiator element signals, where m<n:
    a switch matrix connected between the array and the m processing channels, the switch matrix for switching different combinations of said radiator elements to said channels within a single pulse;
    angle estimation means responsive to the m processing channels for estimating emitter angles, wherein the angle estimation means comprises:
        processing means for extrapolating phase information;
        maximum likelihood angle estimation means for providing a maximum likelihood estimate of the target emitter location in response to the phase information;
    an adaptive switch selector for adaptively selecting subsets of interferometer array elements to improve emitter location accuracy.

2. The system of claim 1, wherein the angle estimation means provides one or more likely target location estimates, and the adaptive switch selector is responsive to the maximum likelihood estimate of the target emitter location and the one or more likely target location estimates, and adaptively determines said subsets of radiator elements to be adaptively selected for processing during a subsequent pulse.

3. The system of claim 1, wherein the switch matrix is responsive to control signals from the adaptive switch selection processor to select said subsets of radiator elements during a pulse.

4. A method for estimating location of an emitter using an interferometer array of n radiator elements with m processing channels, comprising:
    passing signals from the n radiator elements through a switch matrix to the m processing channels, where m<n:
    during a single pulse, switching different combinations of radiator elements to respective ones of the m processing channels, wherein the different combinations of radiator elements constitute non-overlapping groups of elements;
    processing the outputs from the m processing channels for the single pulse to develop likely angle locations of the emitter;
    determining the relative phases between the radiator element signals, comprising performing coherent processing over time by first frequency channelizing the signals from each of said n radiator elements, estimating the frequency of detected emitters, and extrapolating the phase to a common time.

5. A method for estimating location of an emitter using an interferometer array of n radiator elements with m processing channels, comprising:
    passing signals from the n radiator elements through a switch matrix to the m processing channels, where m<n;
    during a single pulse, switching different combinations of radiator elements to respective ones of the m processing channels, wherein the different combinations of radiator elements constitute overlapping groups of elements;
    processing the outputs from the m processing channels for the single pulse to develop likely angle locations of the emitter.

6. The method of claim 5, further comprising:
    determining the relative phases between the radiator element signals.

7. The method of claim 6, wherein said determining the relative phases comprises:
    determined relative phases between respective elements in different groups by adding or subtracting the relative phases of the respective elements with the phase of a common element.

* * * * *